United States Patent
Miyake

[19]

[11] Patent Number: 6,116,521
[45] Date of Patent: Sep. 12, 2000

[54] SPRINKLER HEAD FOR DILUTED MEDICAL FLUID

[76] Inventor: Masaharu Miyake, 2-42, 2-chome, Miyamadai-cho, Kawanishi-City, Hyogo-prefecture, Japan

[21] Appl. No.: 09/211,296

[22] Filed: Dec. 14, 1998

[30] Foreign Application Priority Data

Dec. 27, 1997 [JP] Japan .................................. 9-367570
Feb. 10, 1998 [JP] Japan ................................. 10-044634
Mar. 20, 1998 [JP] Japan ................................. 10-092770

[51] Int. Cl.[7] ................................ A62L 5/02; B05B 7/26
[52] U.S. Cl. .......................................... 239/310; 239/312
[58] Field of Search .................................. 239/19, 22, 61, 239/63, 302, 308, 310, 312, 317, 318, 416.2, 416.3, 427, 528, 416.4, 416.5, 423

[56] References Cited

U.S. PATENT DOCUMENTS

3,104,823  9/1963  Hayes ...................................... 239/302
3,825,187  7/1974  Tatge ....................................... 239/312
4,039,105  8/1977  Chan ....................................... 222/193
4,640,461  2/1987  Williams ................................. 239/317

*Primary Examiner*—Patrick Brinson
*Assistant Examiner*—J. Bocanegra
*Attorney, Agent, or Firm*—Price, Gess & Ubell

[57] ABSTRACT

A sprinkler head for scattering diluted medical fluid, such as fluid fertilizer and nutritive agents, on cultivated vegetables comprising a main body connected at one end to a sprinkler head and at another end to a faucet supplying water. The main body includes a plurality of water flowing passages, an open passage connected to a medical fluid bottle, and a mixing passage. The open passage includes a passage narrowing portion for sucking medical fluid from the medical fluid bottle by increasing water flow speed relative to the rest of the open passage. The medical fluid sucked into the open passage is stirred and diluted by water flowing down the open passage. The diluted medical fluid in the open passage then flows into the mixing passage, where it can be further diluted by water flowing down the plurality of water flowing passages. The dilution ratio of the medical fluid is controlled by individually opening and closing the plurality of water flowing passages with valves. The dilution ratio is lowest when all the water flowing passage are closed and highest when all the water flowing passages are open.

18 Claims, 7 Drawing Sheets

SPRINKLER HEAD FOR DILUTED MEDICAL FLUID

BACKGROUND OF THE INVENTION

1. Field of the Invention

The present invention relates to a diluted medical fluid sprinkler head for gardening use connected to a water feeding hose, having one end connected to a faucet or the like of a service water.

2. Description of the Prior Art

It is indispensable to scatter medical fluids on cultivated vegetables to prevent harmful insects from reproducing or to exterminate them. Generally, medical fluids on the market are diluted on the order of 500 times, 1000 times or 2000 times when necessary, and the diluted medical fluids are atomized to spray them on the cultivated vegetables.

Further, any fluid fertilizers, nutritive agents or the like are diluted on the same order and scattered.

In this invention, the aforementioned medical fluids, fluid fertilizers, nutritive agents or the like are referred to as medical fluids.

As a means for diluting and scattering these medical fluids, a cap of a bottle with medical fluid poured into it is normally used as a weighing measure. The medical fluid poured into the cap is mixed with a given amount of water and is diluted. Then, the diluted medical fluid is moved to an atomizer tank. A given amount of water is poured into the tank of the atomizer, where the medical fluid poured into the cap is mixed and diluted.

But a scattering step of such diluted medical fluid is accompanied by inconveniences described as follows.

(1) It is very difficult to dilute the medical fluids to a desired ratio. The atomized amount of medical fluid is not consistent, and the diluting magnification is different depending upon the type of medical fluid used. Thus, it is very difficult for an operator to normally obtain a desired dilution ratio.

(2) It is very difficult to obtain the diluted medical fluids as necessary by mixing the medical fluids with a given amount of dilution water. As the diluted fluid can be excessive or somehow insufficient in amount, it is often wasteful in producing the diluted fluids.

(3) Since the atomizer itself is heavy, and a tank containing the medical fluids has to be carried, it is very hard to hand carry it or placed it on the shoulder of an operator.

(4) In addition to the expensive atomizer, a specific diluting vessel is required to dilute the medical fluids.

(5) The labor and time required for the preparation of operations such as medical fluid measuring and diluting, tank washing before the dilution, measuring cap washing and so on.

(6) In order to prevent different types of medical fluids from being mixed, it is required to wash the atomizer tank and the other vessel each time a different type of medical fluid is used.

SUMMARY OF THE INVENTION

A objective of this invention is to obtain the desired dilution ratio of medical fluids with ease and accuracy, and further to easily obtain the diluted medical fluids in the necessary amount. Further, it is an objective of this invention to ease the preparation work of the medical fluid scattering, and to provide the operation with lower cost and simple construction.

Another objective is to manufacture a head main body with considerable ease and low cost.

Another objective is to obtain the basic dilution water with accuracy and ease.

Still another objective is to increase the simplicity of operation to further improve the use of the invention.

In order to meet the objectives as described above, this invention basically provides a head main body, connected through a hose to a faucet or the like of a service water, comprising a normally open flow-speed increasing passage which permits the service water to become a jet water current, an open passage connected to a bottle containing the medical fluid, and a plurality of water flowing passages each of which is opened and closed by a make and break valve.

By sucking the medical fluid with the jet water current from the bottle, and mixing the medical fluid with the jet water current, the basic diluted medical fluid can be easily obtained. And by mixing the basic diluted medical fluid with the service water flowing down one or more of the plurality of water flowing passages, the dilution magnification of the medical fluid can be easily changed.

To meet the first objective, the invention has the following configuration.

A head main body has a water feeding hose connecting portion provided at one end, and a sprinkler connecting portion at its other end. The head main body is formed in a straight-line shaped tube body, and the connection between the water feeding hose and the sprinkler is conducted through connectors engaged with a screw on both longitudinal ends of the straight-line shaped tube body. The head main body is provided with a plurality of water flowing passages. One of a plurality of water flowing passages is formed into an open passage where the service water normally flows. The open passage comprises a small-diameter passage for sucking the medical fluids from a medical fluid bottle and a large-diameter passage for downstream flow of the service water. The small-diameter passage includes a passage narrowing portion where the passage diameter is narrowed in the portion of the small-diameter passage where the medical fluid is sucked.

The passage narrowing portion is connected, through a medical fluid sucking passage to the medical fluid bottle, with a female screw tube portion for engaging the bottle provided on the peripheral wall of the head main body. The medical fluid is sucked from the medical fluid sucking passage and is mixed with the service water by the jet water current of the service water flowing down the passage narrowing portion of the small-diameter passage. All the passages including the open passage are merged at the tip end of the main body and flow down to the sprinkling nozzle.

The dilution ratio of the medical fluids can be changed by opening one or more of the water flowing passages.

Hence, a hose connected to a faucet or the like of the service water is connected to one end of the sprinkler head, and the sprinkler is connected to the other end. The service water flows down the hose by opening the faucet and water is sprinkled from the sprinkler.

The passage narrowing portion is provided in the sprinkler head to increase the flow speed of the service water, so that the jet water current reduces the water pressure. As a result, the medical fluid within the bottle is pushed by the atmospheric pressure and is sucked into the medical fluid sucking passage. The sucked medical fluid is discharged from the medical fluid discharging opening of the passage, and flows down the small-diameter passage with the jet water current. The medical fluid passing the small-diameter passage is stirred and diluted by the service water flowing down the large-diameter passage. Thus, the basic dilution water can be obtained.

At this time, the medical fluid within the bottle is accurately sucked by the small-diameter passage.

By mixing the basic diluted fluid with the service water flowing down one or more of the water flowing passages provided in the head main body, the dilution magnification of the medical fluid can be easily and accurately changed.

By keeping the other water flowing passages closed and only using the open passage, the dilution fluid with the highest in concentration can be obtained.

In this manner, the sprinkler of this invention is provided with a plurality of water flowing passages, in addition to the open passage. By opening one or more of the water flowing passages properly, the diluted fluid and the service water flowing down the open water flowing passages, are properly mixed at a desired mixture ratio, by the mixing portion of the sprinkler head. As a result, the dilution ratio is increased as desired.

As described in FIG. 3, a construction can be adopted where all the water flowing passages are set to a passage diameter such that the amount of water flowing down each water flowing passage is the same amount as the water flowing down the open passage. When the dilution ratio of the open passage is 500 times, the dilution ratio is increased to 1000 times by opening one of the water flowing passages. The dilution ratio is increased subsequently to 1500 times when another water flowing passage is opened, and to 2000 times when three water flowing passages are opened.

The sprinkler head for the medical fluid dilution of this invention, by simply engaging the medical fluid bottle with the sprinkling head, can sprinkle the medical fluid dilution water on the cultivating vegetables with the water flowing force of service water or the like. Thus, an expensive atomizer and a specific vessel for the medical fluid dilution are made unnecessary. A desired dilution ratio can be easily obtained by simple construction for opening and closing the water flowing passages using the making and breaking valves. As a result, the diluted medical fluid with the desired dilution ratio can be sprinkled.

By sprinkling with the medical fluid bottle disengaged from the sprinkler head, the service water flowing down the open passage removes the medical fluid remaining in the medical fluid sucking passage. Thus, when the different types of medical fluids are used, there is no possibility of mixing the medical fluids of the other medical fluid bottle with the medical fluid currently being used.

By closing the medical fluid sucking passage with the medical fluid bottle being disengaged from the sprinkler head, only the service water can be sprinkled. Thus, the scattering of the dilution water of the medical fluids and the scattering of the service water can be exchanged freely.

Consequently, the present invention has the following effects.

A bottle containing the medical fluid is connected to the sprinkler head, and the medical fluids of the desired dilution ratio can be scattered with a simple operation of opening and closing the make and break valves of the water flowing passages. An expensive atomizer and a specific vessel for the medical fluid dilution become unnecessary, removing all the bothersome preparations. The dilution ratio can be easily changed by opening and closing the make and break valve of the water flowing passage. As a result, an operator can sprinkle the medical fluid dilution water as much as possible on the cultivating vegetables with easy operation.

By provision of the small-diameter passage for sucking the medical fluids in the open passage, the disturbance conditions can be reduced quickly and the sucking operation of the medical fluids can be conducted with more accuracy, whereby the basic dilution ratio of the medical fluid tends to remain ideal.

The medical fluid diluted water can be scattered on the cultivating vegetables with the water flowing force of the service water or the like simply by engaging the medical fluid bottle with the sprinkling head. Thus, the expensive atomizer and the specific vessel for the medical dilution fluids become unnecessary. The desired dilution ratio can be easily obtained with the simple operation of opening and closing the water flowing passages. As a result, the medical fluid dilution water can be scattered with easy operation.

By sprinkling with the medical fluid bottle being disengaged from the sprinkler head, the service water flowing down the open passage removes the medical fluid remaining in the medical fluid sucking passage. Thus, there is no possibility of mixing the medical fluids of the other medical fluid bottle when using different types of medical fluids.

By closing the medical fluid sucking passage by disengaging the medical fluid bottle from the sprinkler head, only the service water can be sprinkled. Thus, the dilution water of the medical fluids or the service water only can be optionally exchanged.

The passage narrowing portion of the small-diameter passage, partially narrowed in the passage diameter, can be manufactured with the simple construction.

In this invention, the head main body can be formed into the straight-line shaped tube body, and the connection between the water feeding hose and the sprinkler can be conducted through connectors engaged with a screw formed on both longitudinal ends of the straight-line shaped tube body.

The head main body can be manufactured with considerable ease and low price. Especially if the synthetic resin which is a raw material is used in manufacturing.

The narrowing passage portion and the female screw tube portion for engaging the medical bottle are part of another body separate from the main body, and the separate body is mounted into a concave portion formed into the head main body.

It is considerably easy to manufacture a sprinkler head composed of a separate body mounted into a concave portion of the main body than a sprinkler head composed of one body piece.

The open passage in another embodiment is set in the uppermost position of the head main body with the small-diameter passage of the open passage above the large-diameter passage of the open passage, so that the female screw tube portion for engaging the medical bottle is provided on the peripheral wall on the upper side of the head main body. It is desirable to adopt the construction with the medical fluid bottle engaged downwards in its mouth portion.

By positioning the medical fluid bottle opening portion downwards on the upper side of the head main body, the inner medical fluid flows down by gravity into the passage narrowing portion positioned in the uppermost portion of the head main body and is positively sucked by the jet water current produced by the passage narrow portion. The inconvenience of having the medical fluid improperly sucked from the bottom interior due to a change of the service water pressure is diminished. Also, independently of the existence of the pressure change in the service water, the dilution ratio of the basic diluted fluid can be maintained at a constant with accuracy and ease.

It is preferable to add a construction where the narrowing passage portion and the female screw tube portion for engaging the medical bottle are part of another body separate from the head main body, a construction where the head main body is a straight-line shaped tube body, and a construction in which the connection between the water feeding hose and sprinkler is conducted through connectors engaged with a screw formed on both longitudinal ends of the straight-line shaped tube body.

The head main body can be manufactured with further ease and low cost. The head main body can be made more easily and lower cost, especially when a synthetic resin which is a raw material is used in manufacturing.

A third embodiment of the invention includes a water guiding tube having a make and break valve for opening and closing the service water to all the passages of the main body on the water feeding hose side end portion of the head main body.

It is considerably simple to manufacture by having the sprinkler head composed of a separate body mounted into a concave portion of the main body instead of having the sprinkler head composed of one body piece. Especially, when using a synthetic resin raw material in manufacturing. The simplicity of the operation is increased by the provision of the make and break valve opening and closing the service water to all the passages of the main body.

DESCRIPTION OF THE PREFERRED EMBODIMENTS

Some preferred embodiments of a sprinkler head for the medical fluid dilution according to this invention will be described with references to the drawings.

(First Embodiment)

FIGS. 1 through 4 show a first embodiment.

Reference numeral 1 in the drawings is a head main body provided with a water feeding passage A. The head main body 1 is formed into a straight-line shaped tube body 1A. A male screw 2 is provided respectively on the external peripheral faces of both longitudinal ends of the main body.

Figure 1:
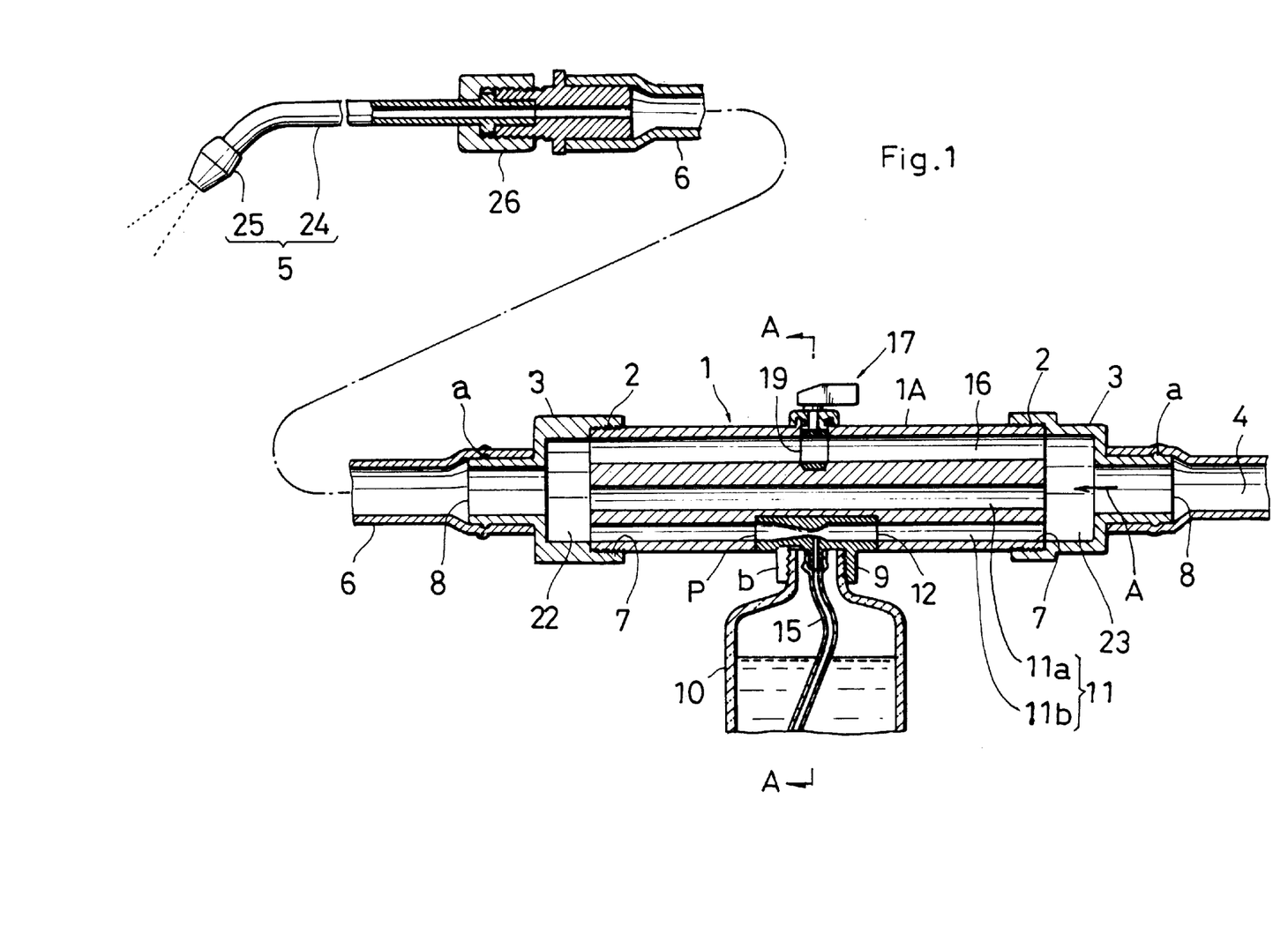
FIG. 1 shows a first embodiment of a sprinkler head of the invention, and is a partially notched longitudinally sectional view of the sprinkler head connected to a medical fluid bottle.

Connecting caps 3 as connectors are respectively screwed onto the male screws 2 provided on the external peripheral face of both longitudinal ends of the straight-line shaped tube body 1A. A water feeding hose 4 is connected to a connecting hose 6 connected to a sprinkler 5 through the connecting caps 3. The other end of the water feeding hose 4 is connected to a faucet of a water service not shown.

Both connecting caps 3 are larger in diameter on the side where they are connected to the straight-line shaped tube body 1A. A female screw 7 is provided on the inner face of the large diameter of the connecting caps 3. The female screw 7 engages the male screw 2 formed on the ends of the straight-line shaped tube body 1A. Both connecting caps 3 have a small diameter connecting tube 8 on the other end side. The small-diameter connecting tube 8 has a ring-shaped rib for hose connection on the external peripheral face.

The end portions of the water feeding hose 4 and the connecting hose 6 are engaged onto the connecting tube 8. Although not shown, a clamping ring is engaged on the external side of the mutual connecting portion when necessary, so as to prevent the hose from coming off.

Three components are adopted, the straight-line shaped tube body 1A, a male screw 2 formed on both ends, and a connecting cap 3 to be connected with a female screw 7. Thus, the head main body 1 can be manufactured with considerable ease and low cost. Especially by using synthetic resin raw material, the manufacturing operation is conducted with considerable ease and low cost.

Reference numeral 9 shows a female screw tube portion which engages a bottle 10 containing medical fluids. The female screw tube portion 9 is provided to screw onto a male screw opening portion 10a of the medical fluid bottle 10. The female screw tube portion 9 forms a so-called breathing slit passage b for maintaining atmospheric pressure within the inner space of the medical fluid bottle 10 being connected externally.

Reference numeral 11 is an open passage formed serially with the water feeding passage A, which is provided with a shaft line parallel to that of the head main body 1.

Figure 3:
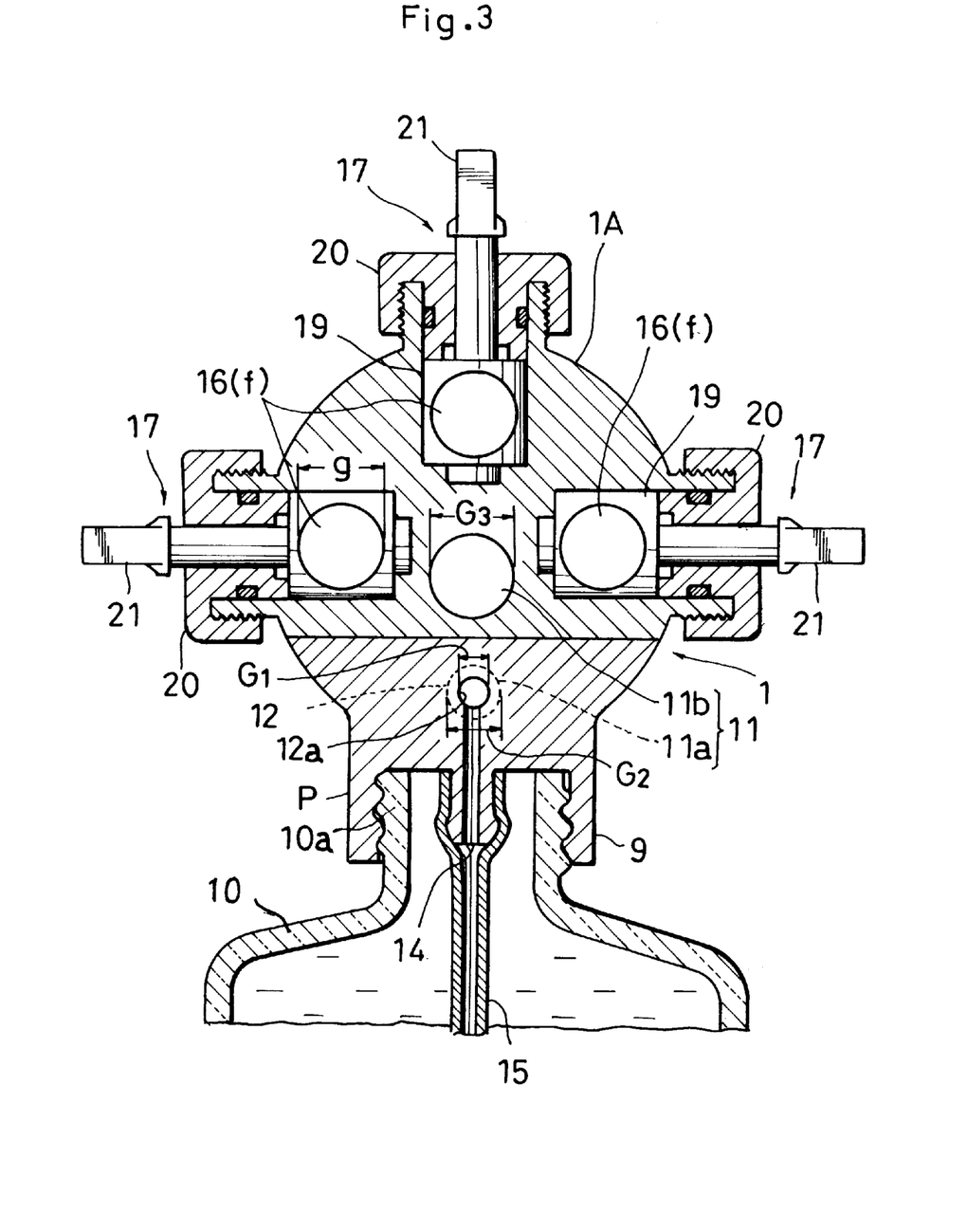
FIG. 3 shows the first embodiment of a sprinkler head of the invention, and is a partially notch-enlarged sectional view taken along a line A—A of FIG. 1.
Figure 4:
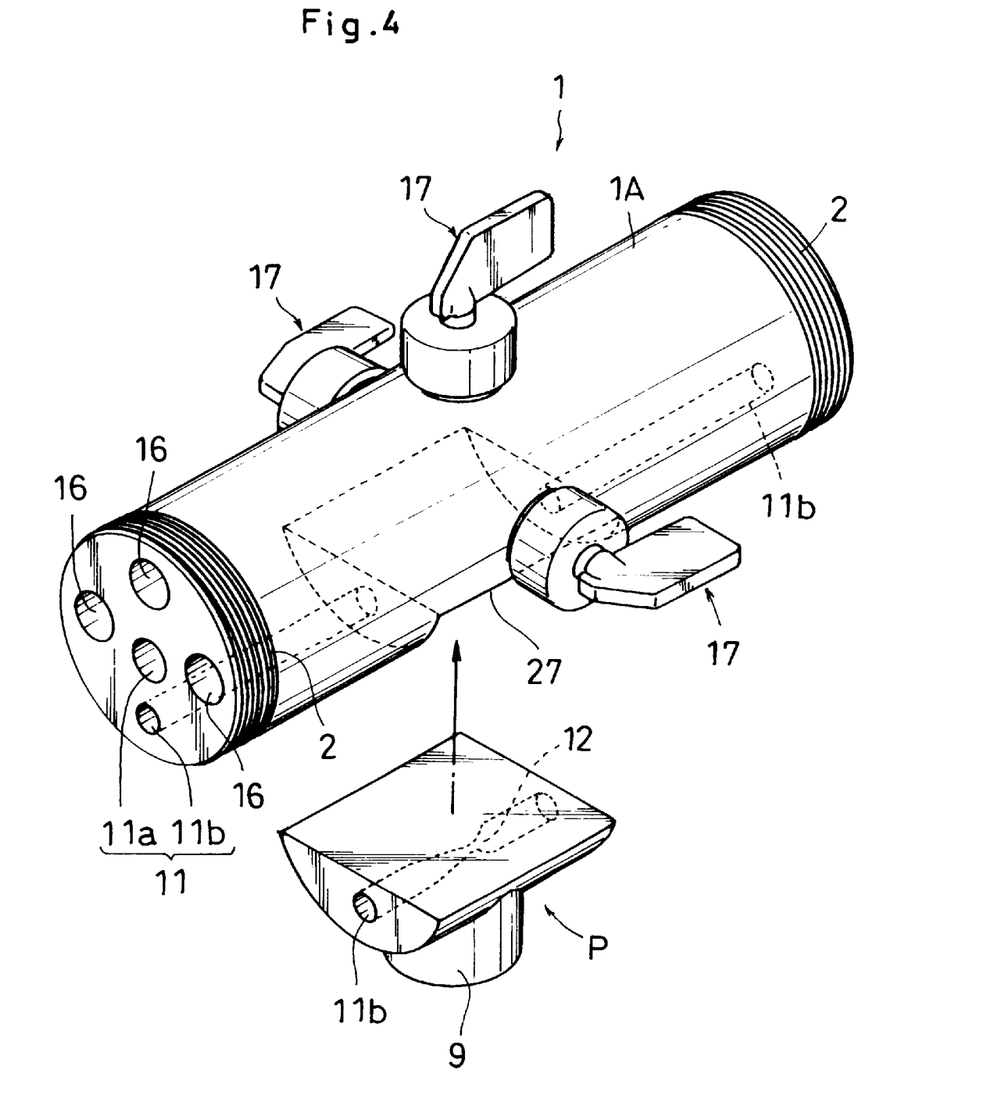
FIG. 4 shows the first embodiment of a sprinkler head of the invention, and is an enlarged explosive perspective view of the essential portions.
Figure 5:
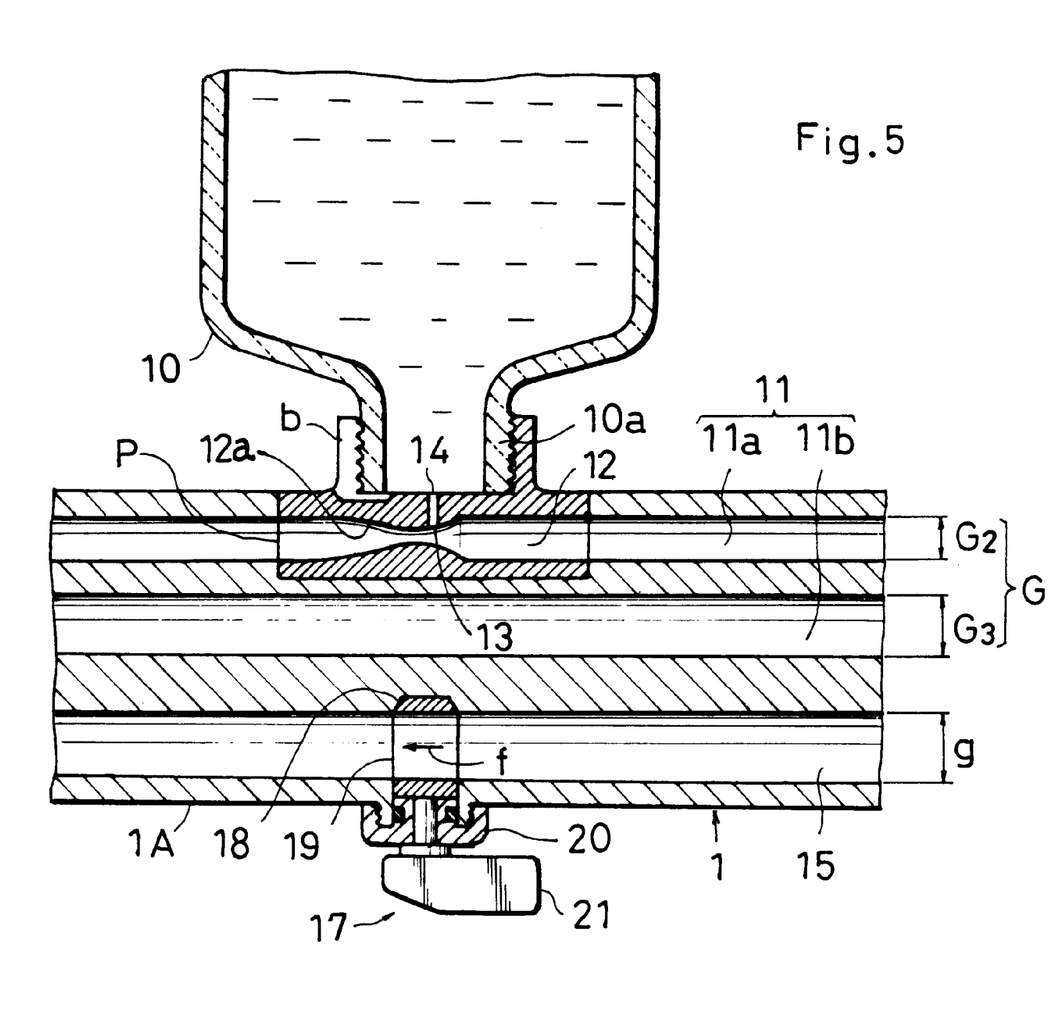
FIG. 5 shows a second embodiment of a sprinkler head of the invention, and is an enlarged longitudinal sectional view of essential portions of the sprinkler head connected to a medical fluid bottle.
Figure 6:
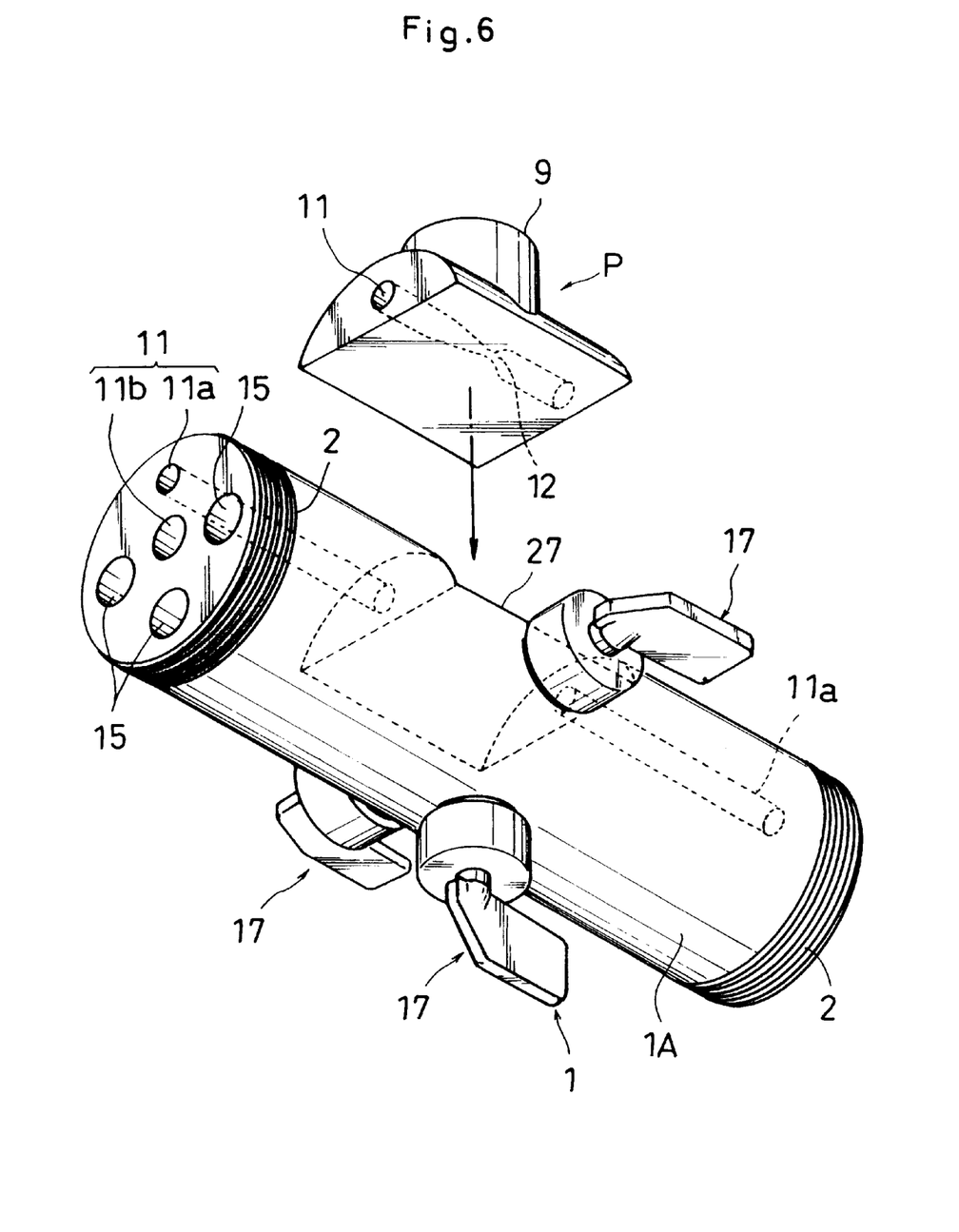
FIG. 6 shows the second embodiment of a sprinkler head of the invention, and is an enlarged explosive perspective view of the essential portions.

The open passage 11 comprises a lower small-diameter passage 11a and an upper large-diameter passage 11b. The passage diameter ratio between the passage diameter $G_2$ of the small-diameter passage 11a and the passage diameter $G_3$ of the large-diameter passage 11b is set within the range of 1:4 through 2:3. In the lower small-diameter passage 11a, a passage narrowing portion 12 which narrows the width of the service water as shown in the inner wall is formed. Reference numeral G of FIG. 3 shows the diameter of the open passage, namely, the total of the passage diameter $G_2$ of the small diameter passage 11a and the passage diameter $G_3$ of the large-diameter passage 11b. Reference numeral $G_1$, shows the passage diameter of the passage narrowing portion 12.

Thus, when the service water flows into the passage narrowing portion 12, the flow speed increases (becomes a jet water current). The passage narrowing portion 12 is decreased in diameter on the tube inner face in about the middle of the small-diameter passage 11a. The passage narrowing portion 12 sequentially narrows the tube inner face in about the middle of the small-diameter passage 11a in the downstream direction of the service water. Later the passage narrowing portion 12 is formed to return to the given passage diameter $G_2$ of the small-diameter passage 11a.

The passage narrowing portion 12 is positioned in the upper portion of the female screw tube portion 9 of the medical fluid bottle 10. A medical fluid discharging opening 13 is positioned immediately before the narrowest portion 12a, namely, in the passage wall on the upper side in the downstream direction of the service water. The medical fluid discharging opening 13 is connected for communication with the interior of the medical fluid bottle 10.

A medical fluid sucking passage 14 is formed through a tube wall of the head main body 1. A flexible tube 15 is connected to the medical fluid sucking passage 14. As shown, the flexible tube 15 is open in a bottom portion within the medical fluid bottle 10. The medical fluid discharge opening 13 is mutually connected for communication with the interior of the medical fluid bottle 10 through the medical fluid sucking passage 14 and the flexible tube 15.

Thus, as the service water flows down at a high velocity in the passage narrowing portion 12, the pressure is reduced. As a result, the medical fluid within the medical fluid bottle 10 is sucked into the medical fluid sucking passage 14 through the tube 15. The medical fluid sucked into the medical fluid sucking passage 14 is sucked in a small amount through the medical fluid discharging opening 13 and is stirred and diluted in the service water.

Three water flowing passages 16 each being the same in-diameter are formed in specified intervals around the axial line of the head main body 1, apart from the opening passage 11, in the straight-line shaped tube body 1A of the head main body 1. In each water flowing 16 passage, a cock type make and break valve 17 is provided. Each make and break valve 17 includes a valve box 18 in the path of the respective water flowing passage 16 and a rotary valve body 19 provided with a passage f built into the valve box 18. An operation lever 21 is connected to the rotary valve body 19 through the valve cover 20, so that the respective water flowing passage 16 can be independently opened and closed.

The diameter g of each water flowing passage 16 has a passage diameter G equal to the sum $(G_2+G_3)$ of the small diameter passage 11a and the large-diameter passage 11b of the open passage 11. The diameter ratio between the diameter of each water flowing passage 16 and the diameter of the open passage 11 is designed to be 1:1.

The passage diameter g of each water flowing passage 11 is formed to have the diameter as the passage diameter G of the open passage 11. The open passage 11 and the plurality of water flowing passages 16 are almost the same in their amount of discharge.

For the following example, the medical fluid is designed to be diluted 500 times in the open passage 11. When one of the flowing water passage 16 is opened, the medical fluid is diluted as much as 1000 times. Similarly, when two water flowing passages 16 are opened, the medical fluid is diluted as much as 1500 times. When all the water flowing passages 16 are opened, the medical fluid is diluted as much as 2000 times.

A mixing passage 22 is formed on the inner side of the connecting cap 3 on the side connected to the connecting hose 6. The mixing passage 22 is provided with volume sufficient for mixing the water flowing down the open passage 11 and the three water flowing passages 16. The mixture in the mixing passage 22 makes it possible to dilute the medical fluid as much as desired 500 through 2000 times. An expanding passage 23 is formed on the inner side of the connecting cap 3 on the side connected to the water feeding hose 4. The expanding passage 23 is also provided with volume sufficient to flow water down the open passage 11 and the three water flowing passages 16.

The sprinkler 5 comprises a water guiding tube 24, and a sprinkling nozzle 25 connected for its free detachable operation with the tip end of the head main body 1. The diluted fluid flowing down the head main body 1 is jetted at a high velocity. The sprinkler 5 is connected to the connecting hose 6 through a screw connected to the end of the water guiding tube 24 by a coupler 26.

The passage narrowing portion 12 formed on the small-diameter passage 11a of the open passage 11 and the female screw tube portion 9 are constructed as a separate body piece P from the straight-line shaped tube body 1A.

The configuration of the separate body piece P is as follows.

Figure 2:
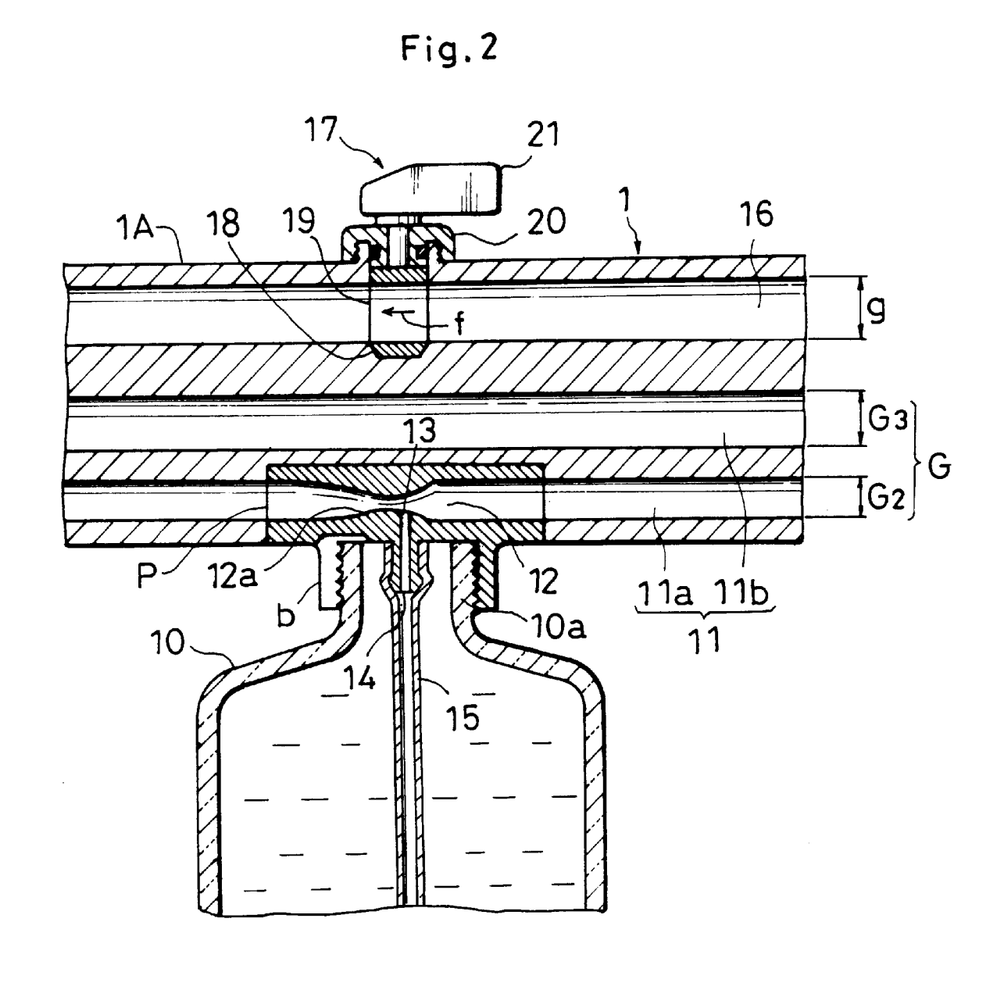
FIG. 2 shows the first embodiment of a sprinkler head of the invention, and is an enlarged longitudinal sectional view of essential portions of the sprinkler head connected to a medical fluid bottle shown in FIG. 1.

In the service water downstream direction, as shown in FIG. 2, the diameter of the passage at both ends of the piece P equal the maximum longitudinal passage diameter around the passage narrowing portion 12 of the small-diameter passage 11a. As shown in FIG. 3, the upper portion of the piece is shown as a horizontal line passing slightly lower than the lowermost portion of the large-diameter passage 11b of the open passage 11. The piece P is formed separately from the straight-line shaped tube body 1A, and includes the female screw tube portion 9 as shown especially in FIG. 4.

A concave portion 27 is formed into the straight-line shaped tube body 1A for receiving the piece P. The straight-line shaped tube body 1A and the piece P are integrally joined by a proper means with the piece P being engaged with the concave portion 27. The welding means, which is, for example, a synthetic resin molding product, uses a bonding agent. Also, when it is metal, a means such as depositing welding material or the like is adopted.

The manufacturing operation has advantages of being considerably easier and lower in cost as compared with a case where the whole sprinkler head is constructed to be one integrated piece. This object is further enhanced by the use of a synthetic resin raw material in manufacturing.

The function of the first embodiment will be described hereinafter.

A water feeding hose 4 is connected to the rear end portion of the head main body 1. The medical fluid bottle 10 is engaged to the female screw tube portion 9. In order to obtain the desired diluting ratio, the necessary number of a plurality of water flowing passages 16 are selected. The necessary operations are conducted by opening the corresponding make and break valve 17 of the selected water flowing passages 16. When the water flows, the service water flows down the open passage 11 and the flowing velocity increases in the passage narrowing portion 12. The service water flows down to the mixing passage 22 due to the decreased pressure.

The service water flows down the passage narrowing portion 12 at a high velocity, thus reducing the pressure in the area of the passage narrowing portion 12. As a result, the medical fluid within the bottle 10 is sucked into the medical fluid sucking passage 14 through the flexible tube 15. The medical fluid is discharged in a very small amount through the medical fluid discharging opening 13 and flows down the small-diameter passage with the service water.

The medical fluid passes the small-diameter passage 11a so that it is stirred and diluted with the service water flowing down the large-diameter passage 11b in the mixing passage 22. Thus, it is diluted to, for example, 500 times in the given dilution ratio.

When the water flowing passage 16 is open, the service water flows down water flowing passage 16 from the water feeding passage A. As a result, the service water is mixed, in the mixing passage 22, with the diluted fluid flowing down from the open passage 11. The dilution ratio of the diluted fluid is greatly increased by this mixing. In this manner, a four-level dilution ratio of 500 times, 1000 times. 1500 times and 2000 times can be easily obtained in accordance with the number of open water flowing passages 16.

The diluted medical fluid is guided to the water guiding tube 24 from the mixing passage 22, and is finally jetted with force from the sprinkling nozzle 25.

The change in the dilution ratio can be easily achieved by opening and closing the water flowing passage 16 by the switching operation of the make and break valve 17 provided on the peripheral wall of the head main body 1. Thus, the medical fluid dilution water can be sprinkled, onto cultivated vegetables, as much as possible with ease.

The sucking of the medical fluids can be operated more efficiency by the provision of the specific passage for sucking the medical fluid, namely, the small-diameter-passage 11*a*.

By sprinkling with the medical fluid bottle 10 disengaged from the sprinkler head, the medical fluid remaining in the medical fluid sucking passage 14 is washed away and is discharged with the service water. Thus, when different medical fluids are sprinkled, the different medical fluids have no possibility of being carelessly mixed even if the bottle is changed to a medical bottle 10 containing a different medical fluid.

(Second Embodiment)

FIG. 5 through FIG. 6 show a second embodiment.

A fundamental idea of the second embodiment is that the passage narrowing portion 12 provided for obtaining the jet water current to suck the medical fluid is formed in the uppermost portion of the head main body 1, and the medical fluid bottle 10 is engaged with the periphery on the upper side of the head main body 1, whereby the medical fluid can be fed from above to the passage narrowing portion 12 with the assistance of gravity.

By positioning the opening portion 10*a* of the bottle 10 on the upper side of the head main body 1, the medical fluid within the medical fluid bottle 10 flows down to the passage narrowing portion 12 naturally by gravity. It is positively sucked by the jet water current produced by the passage narrowing portion 12. Thus, the basic diluted medical fluid can be obtained with accuracy and ease. A desired dilution ratio of the medical fluid can be easily and accurately obtained by mixing diluted fluid with the service water flowing down one or more of a plurality water flowing passages 16 provided in the head main body 1 with the diluted fluid. Namely, the dilution magnification of the medical fluid can be freely changed with ease. Further, the necessary amount of diluted fluid can be obtained with ease.

The concrete configuration of the second embodiment will be described hereinafter.

The fundamental idea of the second embodiment is that, as described above, the medical fluid can be fed with the assistance of gravity by having the medical fluid bottle 10 positioned above the head main body 1. In the construction, the top and bottom of the head main body 1 are reversed as compared with those of the first embodiment. In another construction, the second embodiment is fundamentally the same as the first embodiment. The same reference numerals are used as in those of the first embodiment in the same configurations. The detailed descriptions are omitted.

In the second embodiment, as shown in the drawing, the female screw tube portion 9, which engages the bottle 10 containing the medical fluid, is opened upwards on the upper peripheral wall of the head main body 1. The medical fluid bottle 10 is screwed and engaged upside down so that the male opening portion 10*a* of the bottle 10 is downward. In the female screw tube portion 9 forms a so-called breathing slit passage b for maintaining atmospheric pressure within the internal space of the medical fluid bottle 10 being connected externally.

Accordingly, a tube 15 is not necessary as in the first embodiment.

The open passage 11, within the head main body 1, is set in the uppermost position of the main body. The small-diameter passage 11*a* of the open passage 11 is set in position above the large-diameter passage 11*b*.

The passage narrowing portion 12 is formed below the female screw tube portion 9 engaging the medical fluid bottle 10. The medical fluid discharging opening 13 open immediately before the narrowest portion 12*a* of the passage narrowing portion and the interior portion of the medical fluid bottle 10 are directly connected to the medical fluid sucking passage 14 drilled through the tube wall of the head main body 1.

Since the service water flows down at a high velocity in the passage narrowing portion 12, the pressure is reduced. As a result, the medical fluid within the medical fluid bottle 10 is sucked efficiently into the medical fluid sucking passage 14, assisted by gravity. The medical fluid sucked into the medical fluid sucking passage 14 is discharged through the medical fluid discharging opening 13 so that the discharged medical fluid flows down with the service water.

The medical fluid passing the small-diameter passage 11*a* is stirred and diluted, by the mixing passage 22 and service water flowing down the large diameter passage 11*b*. Thus, the medical fluid is diluted to, for example, 500 times in the given dilution ratio.

When the water flowing passage 16 is open, the service water flows into the water flowing passage 16 from the water feeding passage A. As a result, the service water is mixed, by the mixing passage 22, with the diluted fluid flowing down from the open passage 11. The dilution ratio of the diluted fluid is greatly increased by this mixing. In this manner, a four-level dilution ratio of 500 times, 1000 times, 1500 times and 2000 times can be easily obtained-in accordance with the number of open water flowing passage 16.

The diluted medical fluid is guided to the water guiding tube 24 from the mixing passage 22, and finally is jetted with force from the sprinkling nozzle 25.

In the second embodiment, there are further advantages in addition to the first embodiment.

With the female screw tube portion 9 engaging the medical liquid bottle 10 being provided on the peripheral wall on the upper side of the head main body 1, the medical fluid bottle 10 is engaged with the male screw opening portion 10*a* in its downward posture, so that the inner medical fluid flows down to the small-diameter passage 11*a* through the medical fluid sucking passage 14 with the assistance of gravity. The function of sucking the medical fluid by the passage narrowing portion 12 is achieved with more accuracy and efficiency.

(Third Embodiment)

FIG. 7 shows a third embodiment.

The fundamental idea of a third embodiment is increasing operation simplicity by having a make and break valve control the service water flow into all the passages of the main body 1.

The concrete configuration of the third embodiment will be described hereinafter.

Figure 7:
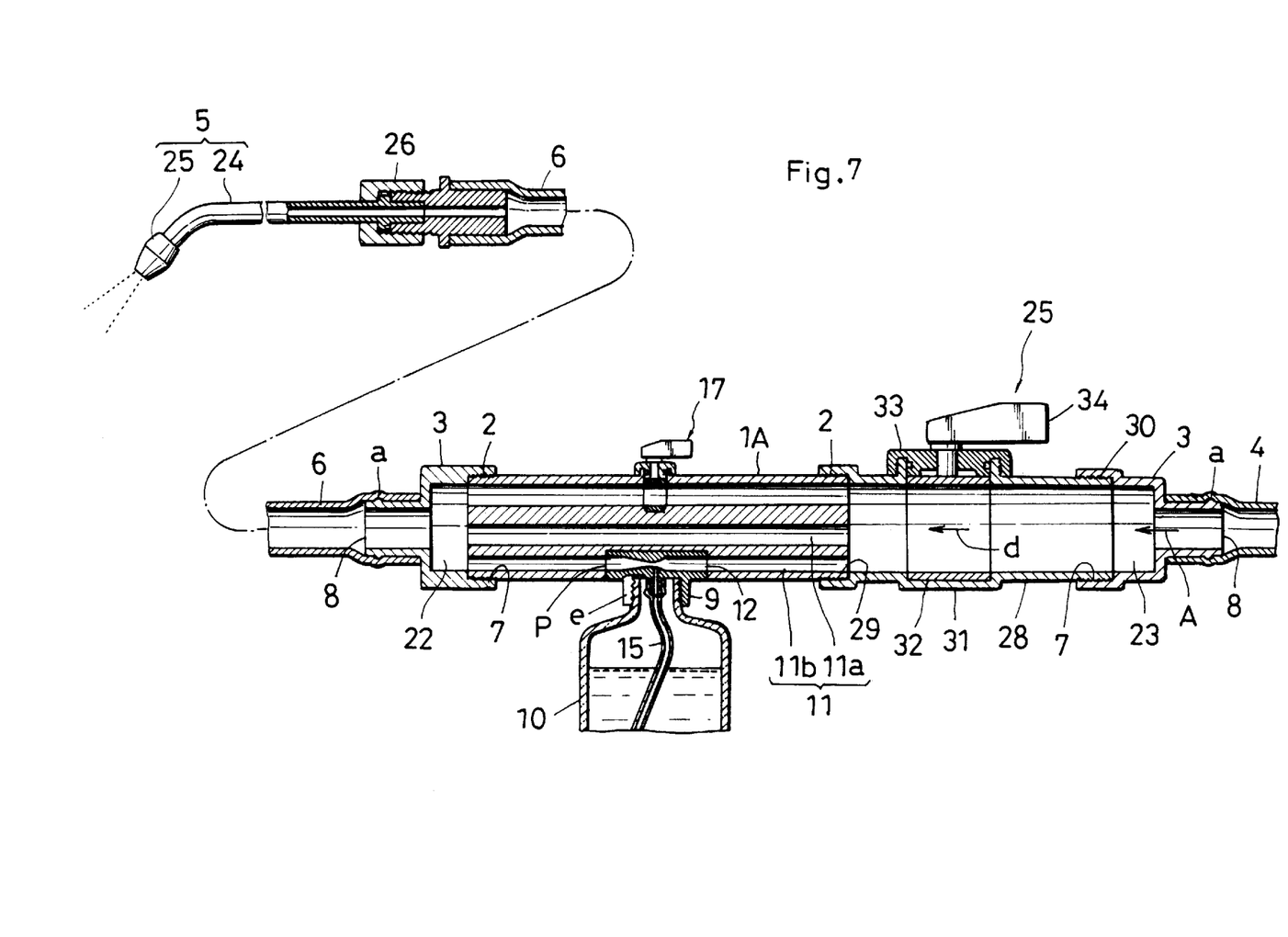
FIG. 7 is a third embodiment of a sprinkler head of the invention, and is a partially notched longitudinally sectional view of the sprinkler head connected to a medical fluid bottle.

The fundamental idea of the third embodiment is to improve the operation simplicity by having the make and break valve control the service water flow into all of the passages, as described above. In the construction, there is a difference in the make and break valve, on the upper stream side of the head main body 1 as compared with the first and second embodiments. In other construction, the third embodiment is fundamentally the same as the first, second embodiments. The same reference numerals are used as in those of the first and second embodiments in the same configurations. The detailed descriptions are omitted.

Concretely, a water guiding tube 28 provided with a make and break valve 27 is connected to the side of the water feeding hose 4 of the head main body 1. The water guiding tube 28 is provided with a female screw 29 on the side adjacent to the head main body which engages the head main body 1 by screwing into the male screw 2 of the side end of the head main body 1. A male screw 30 is formed on the external periphery of the side end portion of the water feeding hose 4. The connecting cap 3 on the side end of the water feeding hose 4 is engaged with the male screw 30 to the female screw 7. The manufacturing operation of the head main body can be made easier with the make and break valve 27 controlling the service water flow into all the passages of the main body 1.

The make and break valve 27 is of a cock type. As shown in the drawing, a valve box 31 is formed on the downstream side of the head main body 1 and a rotary valve body 32 having a passage d built into the valve box 31. An operation lever 34 is serially provided in the rotary valve body 32 through the valve cover 33 to control the water flowing down passage A and to adjust the water amount.

In the third embodiment, the sprinkler head is composed of a separate body piece P mounted into a concave portion 27 of the main body 1 instead of one body piece. By this configuration, the manufacturing operation can be conducted with considerably ease and low price as compared with a case where the sprinkler head is composed of one body piece from the beginning. This object is further enhanced by using a synthetic resin raw material in manufacturing.

Those skilled in the art will appreciate that various modifications can be made to each embodiment of the invention without departing from the principle or scope of the invention.

What is claimed is:

1. A sprinkler head for diluted medical fluid wherein
    a head main body provided with a connecting portion of a water feeding hose at its end, and a connecting portion of a sprinkler provided its tip end with a sprinkling nozzle at its other end is formed in a straight-line shaped tube body;
    a plurality of water flowing passages to be opened and closed by make and break vales and an open passage where the service water can always flow down are independently provided respectively in the head main body;
    the open passage is composed of a specific small-diameter passage for sucking the medical fluids and a specific large-diameter passage of the service water downstream;
    a flowing speed increasing passage where the passage diameter is partially narrowed is formed in the small-diameter passage;
    an engaging means of a medical fluid bottle provided on the peripheral wall of the head main body, and the flowing speed increasing passage are connected, for communication through the medical sucking passage where the medical fluids within the medical fluid bottle is sucked, where the medical fluid is sucked from the medical fluid sucking passage and is mixed with the service water by the jet water current of the service water flowing down into the flowing speed increasing passage;
    all the passages including the open passage are merged in the tip end and is formed so as to flow down to the sprinkling nozzle to change the dilution ratio of the medical fluid by one of the flow water passages or more and the combination with the open passage.

2. A sprinkling head for diluted medical fluid according to claim 1, where the connection of the water feeding hose and the sprinkler is conducted through a connector engaged with a screw to be formed on both the longitudinal ends of the straight-line shaped tube body.

3. A sprinkling head for diluted medical fluid according to claim 1, where the narrowing passage portion including the engaging means of the bottle is constructed as another body from the head main body, and the open passage is fixed to a mounting concave portion formed to the head main body in such a shape as the narrowing passage portion is continuous to the specific small-diameter passage for sucking the medical fluid.

4. A sprinkling head for diluted medical fluid according to claim 1, where the open passage is positioned in the uppermost position of the head main body, and the small-diameter passage and the large-diameter passage of the open passage are formed in that the former, in the upper position, is formed in a specific passage for sucking the medical fluid and the latter, in the lower position, is formed in a specific passage downstream of the service current, so that the engaging means is provided on the peripheral wall on the upper side of the head main body, where the medical fluid bottle is engaged downwards in its mouth portion.

5. A sprinkling head for diluted medical fluid according to claim 1, where a water guiding tube having make and break valves for opening and closing the whole passages constructed in another body is provided in the water feeding hose side end portion of the head main body.

6. A sprinkling head for diluted medical fluid according to claim 2, wherein the narrowing passage portion including the engaging means of the bottle is constructed as another body from the head main body, and the open passage is fixed to a mounting concave portion formed to the head main body in such a shape as the narrowing passage portion is continuous to the specific small-diameter passage for sucking the medical fluid.

7. A sprinkling head for diluted medical fluid according to claim 2, where the open passage is positioned in the uppermost position of the head main body, and the small-diameter passage and the large-diameter passage of the open passage are formed in that the former, in the upper position, is formed in a specific passage for sucking the medical fluid and the latter, in the lower position, is formed in a specific passage downstream of the service current, so that the engaging means is provided on the peripheral wall on the upper side of the head main body, where the medical fluid bottle is engaged downwards in its mouth portion.

8. A sprinkling head for diluted medical fluid according to claim 3, where the open passage is positioned in the uppermost position of the head main body, and the small-diameter passage and the large-diameter passage of the open passage are formed in that the former, in the upper position, is formed in a specific passage for sucking the medical fluid and the latter, in the lower position, is formed in a specific passage downstream of the service current, so that the engaging means is provided on the peripheral wall on the upper side of the head main body, where the medical fluid bottle is engaged downwards in its mouth portion.

9. A sprinkling head for diluted medical fluid according to claim 2, where a water guiding tube having make and break valves for opening and closing the whole passages constructed in another body is provided in the water feeding hose side end portion of the head main body.

10. A sprinkling head for diluted medical fluid according to claim 3, where a water guiding tube having make and break valves for opening and closing the whole passages constructed in another body is provided in the water feeding hose side end portion of the head main body.

11. A sprinkling head for diluted medical fluid according to claim 4, where a water guiding tube having make and break valves for opening and closing the whole passages constructed in another body is provided in the water feeding hose side end portion of the head main body.

12. A mixing assembly for adding a fluid additive to a flow of water to be distributed through a manually held nozzle comprising:
   a mixer body member having a first conduit including a restrictor, a port adjacent the restrictor, and a coupler, a second conduit, and at least a third conduit with a first manual valve member for controlling the flow of water through the third conduit;
   a container for holding the fluid additive, the container is mounted in the coupler and is fluidly connected to the port for dispensing the fluid additive into the fist conduit as a result of the flow of water across the restrictor; and
   a common mixing passage fluidly connected to outlets of the first through third conduits for receiving and mixing the discharge from the conduits, wherein each of the first through third conduits run an entire length of the mixing body member and the conduits are aligned parallel to each other along the entire length of the mixing body.

13. The mixing assembly of claim 12, further including a common mixing passage in the mixer body member downstream of the first through third conduits.

14. A sprinkler head for diluting medical fluid, comprising:
   a head main body which comprises
      a plurality of water flowing passages, an open small-diameter passage and an open large-diameter passage, each one running through an entire length of the head main body, wherein the small-diameter passage has a passage narrowing portion where the diameter of the small-diameter passage is narrowed for increasing water flow speed therethrough;
   valves for independently opening and closing each water flowing passage;
   engaging means on an outer wall of the head main body for securing a medical bottle containing medical fluid to the main head body; and
   a medical sucking passage fluidly connected between the passage narrowing portion of the small-diameter passage and the medical fluid bottle, wherein water flowing down the passage narrowing portion sucks medical fluid into the small-diameter passage;
   a first connecting cap fluidly connecting one end of the head main body to a water feeding hose, wherein an interior space of the first cap defines an expanding passage for directing water from the water feeding hose into the passages of the head main body; and
   a second connecting cap fluidly connecting a down stream end of the head main body to a connecting hose, wherein an interior space of the second cap defines a mixing passage for receiving and mixing water flowing down the passages of the main head body, whereby the fluid sucked into the small-diameter passage is diluted by water flowing into the mixing passage.

15. The sprinkler head of claim 14 wherein the passage narrowing portion of the small-diameter passage and the engaging means are formed on a body piece separate from the head main body and the head main body has a concave portion for receiving and mounting the body piece to the head main body.

16. The sprinkler head of claim 14 wherein the dilution ratio of the medical fluid in the mixing passage is adjusted by independently opening and closing the water flowing passages with the valves.

17. The sprinkler head of claim 14 further comprising a water guiding tube fluidly connected between the head main body and the first connecting cap, wherein the water guiding tube includes a valve for controlling water flow from the watering feeding hose into all the passages of the head main body.

18. The sprinkler head of claim 14 wherein the passages of the head main body are aligned parallel to each other.

* * * * *